March 3, 1970        H. P. HATHAWAY        3,498,779

APPARATUS FOR MELTING HIGHLY CORROSIVE GLASS COMPOSITIONS

Filed Oct. 30, 1967        3 Sheets-Sheet 3

INVENTOR.
HARLEY P. HATHAWAY
BY E. J. Holler &
W. A. Schaich
ATTORNEYS

United States Patent Office 3,498,779
Patented Mar. 3, 1970

3,498,779
APPARATUS FOR MELTING HIGHLY CORROSIVE GLASS COMPOSITIONS
Harley P. Hathaway, Toledo, Ohio, assignor to Owens-Illinois, Inc., a corporation of Ohio
Filed Oct. 30, 1967, Ser. No. 678,814
Int. Cl. C03b 5/32
U.S. Cl. 65—327      5 Claims

ABSTRACT OF THE DISCLOSURE

Method and apparatus wherein glass batch mix of highly corrosive glass components, immediately on entry into a cold-wall metal tank-type furnace, contacts a water-cooled shelf and a water-cooled bridge-wall which function together to retard advance of the batch and create a pile of only partly fluxed batch, such providing both cover protection for the charging screw against the intense furnace heat and retarding flow of batch through the furnace so that complete melting and essential homogeneity of the components prior to discharge is assured. Also a platinum strip covering inner face of refractory wall at melt-line to prevent erosion by glass.

BACKGROUND OF THE INVENTION

My invention is a novel method of and apparatus for melting extremely corrosive glass compositions such as enameling or glazing glasses, in a manner to ensure both the desired and most essential homogeneity in the product and exceptionally long furnace life.

It is also an object of my invention to provide a novel method of and apparatus for satisfactorily melting glass compositions which normally are difficult to homogenize, largely because of very substantial variations in both the density and solubility of the several raw batch components involved.

Another object of my invention is the provision of a glass-melting furnace comprising a water-cooled metal tank surrounded by refractory walls and a roof, or crown, there being a platinum skirt at the refractory-to-water-cooled tank interface, to protect the refractory against erosion or corrosion at the "melt-line," thereby to substantially reduce, if not entirely eliminate, refractory contamination of the end product. The water-cooling, of course, also prolongs the useful life of the platinum skirt.

Moreover, it is an object of my invention to provide in a melting furnace, or tank, of the above type, baffles, bubblers and/or stirrers, of platinum or platinum alloy, thereby to aid materially in the production of a completely homogeneous glassy product.

It is likewise an object of my invention to provide means at the batch-charging end, or raw batch inlet, for creating a pile or mound of batch, of comparatively low temperature, encasing and protecting the adjacent end of the charging screw against the furnace heat and by means of a water-cooled dam, or barrier, retarding the flow of batch to and through the furnace proper, so that the building and stabilization of such pile do not exceed the true melting capacity of the furnace. Otherwise, complete solution of the higher-melting, less soluble, components would be impossible and as a consequence only a partially glassy product would result. A further advantage flowing from the piling of batch, as explained above, is that it results in the creation of a slowly moving surface glaze which prevents excessive dusting and/or volatilization losses of batch components, more especially lead oxide, which is an important constituent of the glass with which I am concerned, but which is highly volatile.

Further, it is an object of my invention to provide a water-mooled shelf and bridge-wall at the charging end of the furnace, together with a novel bubbler arrangement quite close to the bridge-wall, so that agitation of the batch and mixing of its components is initiated at the earliest possible moment following entry of the total batch into the furnace proper.

Finally, it is also an object of my invention to provide a novel, readily removable water-cooled discharge-spout unit over which hot, homogeneous glass flows, then is quenched and falls by gravity to a fritting mechanism below.

Other objects will be in part apparent and in part pointed out hereinafter.

In the accompanying drawings forming a part of my application:

As is evident from the foregoing, the present invention is primarily concerned with the production of highly corrosive glasses and more particularly the so-called enameling glasses, which, in the instant case, may comprise: PbO (lead oxide) 77.9%; $B_2O_3$ (Borax or boric oxide) 9.8%; $SiO_2$ (silica or silicon dioxide) 1.8%; ZnO (zinc oxide) 10.0%; and $Al_2O_3$ (alumina or aluminum oxide) 0.5%; such composition having a melting temperature in the range of 2150–2250° F. The subject method and apparatus may also be used to melt a wide variety of enamels, glazes or glass compositions, especially those containing lead and zinc oxides.

Figure 3:
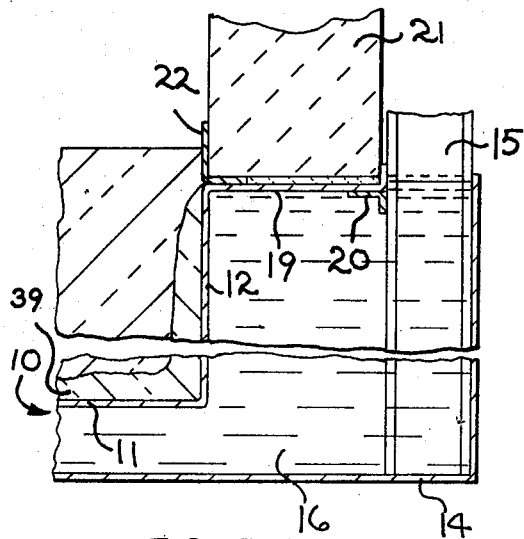
FIG. 3 is a detailed fragmentary sectional view showing the relationship between the inner and outer tanks, the mounting for the refractory walls, and the position of the platinum skirt or strip which protects the refractory at the glass level.

Structurally, the glass melting furnace comprises an inner generally rectangular steel tank 10 having a bottom 11 and upstanding side and end walls 12 and 13, respectively. This tank is positioned in a similarly-shaped outer steel tank 14, of somewhat greater length and width, but preferably of about the same height. These tanks are held spaced apart by buckstays 15 (FIG. 3), or equivalent spacing means, thereby to create a cooling chamber 16 which extends along the bottom, sides and ends of the inner tank. Cooling water may enter the chamber through an inlet pipe 17 and leave it through a discharge pipe 18. The upper margin of the inner tank walls (FIG. 3) is extended horizontally outward to form shelves 19 which abut the buckstays 15. Angle iron members 20, or like elements, secured to the buckstays, support the free ends of the shelves 19 which form a base for the refractory superstructure which may comprise conventional bricks 21. Along the joint between the shelf and first or bottom course of bricks, and in fact covering the inner face of this course of bricks, is an angular strip 22, or skirt, formed of platinum or a platinum alloy. This strip in part extends between the shelf and the refractory bricks 21 and, as will be seen in FIG. 3, the vertical wall of this strip, or skirt, extends a short distance both above and below the melt-line or surface of glass batch, thereby to effectively protect the refractory against the detrimental corrosive effects of the glass batch being melted.

Figure 5:
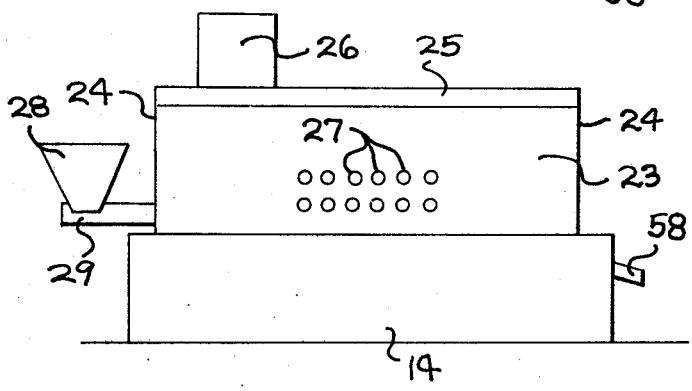
FIG. 5 is a general side elevational view of the furnace.

The refactory superstructure which rests at least in part upon the shelves 19, as explained above, in part closes the upper side of the cooling chamber 16 and provides side and end walls 23 and 24, respectively, for the combustion or heating chamber overlying the entire mass of glass batch being melted. A roof 25 (FIG. 5) may rest upon these walls, its continuity being broken by a stack 26 which, at its lower end, opens into the space over the batch near the charging end of the furnace. Each side wall 23 has a plurality of burner ports 27 substantially as shown. These may be of any number and location desired.

The batch-forming components are mixed and placed in a hopper 28 from which they flow by gravity to a water-cooled screw-charger 29 which propels the batch through an inlet opening 30 in an end wall 24 of the superstructure and into the furnace. Immediately upon entry into the furnace, the batch is deposited on an inclined water-cooled shelf 31 upon which it accumulates to form a pile 32, or mount, behind a water-cooled dam 33 to be described. This shelf is the top wall of a box-like sheet metal structure of hollow form, the interior being open to the chamber 16 containing circulating cool water. Thus the shelf temperature may be held well below the maximum melting temperature with the result that the batch components capable of being fluxed at a relatively low temperature create a constantly advancing cover layer 34 which at least in part functions to minimize dusting losses, as well as to control volatilization of the lead oxide, for example. Later, this mix is exposed to the maximum melting temperature in the furnace proper to effect total solution of all its components and the creation of a completely homogeneous mass. It is apparent that the accumulated batch on the shelf also functions to insulate the otherwise exposed inner end of the batch charger against the intense furnace heat.

Immediately adjacent the lower end of the shelf 31 is the transverse water-cooled bridge 33, or dam, comprising, in the specific form shown, a pair of parallel horizontal pipes 33a, positioned at different levels to produce an effective barrier which both retards batch flow from the shelf to the high temperature zone to ensure creation of the essential pile on the shelf and aids in preventing surface channeling of raw batch to the opposite end of the furnace. Without this bridge, the glass batch mix would not form the essential pile or mound, and would flow quite rapidly to the output end of the furnace. Consequently, some of the components, more particularly the zinc oxide, would not have time to dissolve completely and instead would produce a slush-like surface layer on the mass. Thus, the dam constitutes a physical barrier to slow down batch flow and more or less stabilize and build an adequate pile on the shelf 31, this being related directly to the glass melting capacity of the tank or furnace, in that the batch must not be permitted to move into and through the melting area faster than the components can be completely dissolved and chemically combined.

A bubbler 35 extends across the tank near said shelf and dam, such being a pipe having a section submerged in the batch and formed with a plurality of perforations 36 through which air or gas is emitted to create bubbles which rise through the glass and contribute to mixing of the components. One end of the pipe is connected to a suitable source of supply (not shown). Beyond the bubbler 35 is a baffle or skimmer 37 comprising a vertical transverse sheet of platinum, or platinum alloy, which extends entirely across the tank with its ends fitted into guides 38. Vertically this baffle extends from a point slightly above the glass level to a point just above the layer 39 of devitrified glass. Through a plurality of perforations 40 near the upper margin of this baffle or skimmer, the hot, melted glass flows, leaving any surface skum behind, it being understood that these perforations are located near the "melt" surface of the glass in the area of the hot layer of glass. The devitrified glass 39 which covers both the bottom and side walls of the inner tank effectively protects it against the detrimental effects of the furnace heat and glass erosion.

Stirrers 41 of platinum or an alloy having comparable properties are positioned beyond the baffle 37 for the sole purpose of further agitating the glass batch preparatory to its entering a trough 42 on its way to a refining chamber 43 and, in part, prevent the zinc oxide from accumulating as a layer of slush on the batch surface. If desired, a bubbler similar to 35 may be substituted for the stirrers 41.

Preferably, though not necessarily, this refining chamber 43, which is formed of platinum or a platinum alloy, is of generally triangular form in top plan and comprises a floor 44 extending from the base of the vertical transverse end wall 45 at the innermost end of the chamber to a relatively short end wall 46 near the outer or apex end. Side walls 47 interconnect the ends of the two transverse walls 45 and 46 and are extended beyond the ends of the shorter wall 46, terminating at opposed sides of an inclined discharge spout 48. The inlet trough 42 preferably has its inlet end positioned in the area substantially between the two stirrers 41 at a level to permit the flow of surface glass into the refining chamber. As is evident, this chamber is open-top and its side walls extend a short distance above the glass surface. Across the chamber is a baffle 49 or screen positioned near the shorter wall 46, such being a vertical strip of platinum having a plurality of apertures 50 quite close to its lower edge and through which all glass must flow to the discharge point, since its upper margin is above the surface level of the mass of glass. Thus it tends to screen out undissolved "batch inclusions," etc. from the glass about to be discharged from the furnace. It also prevents "wash" of the molten glass from the stirrers 41.

Figure 1:
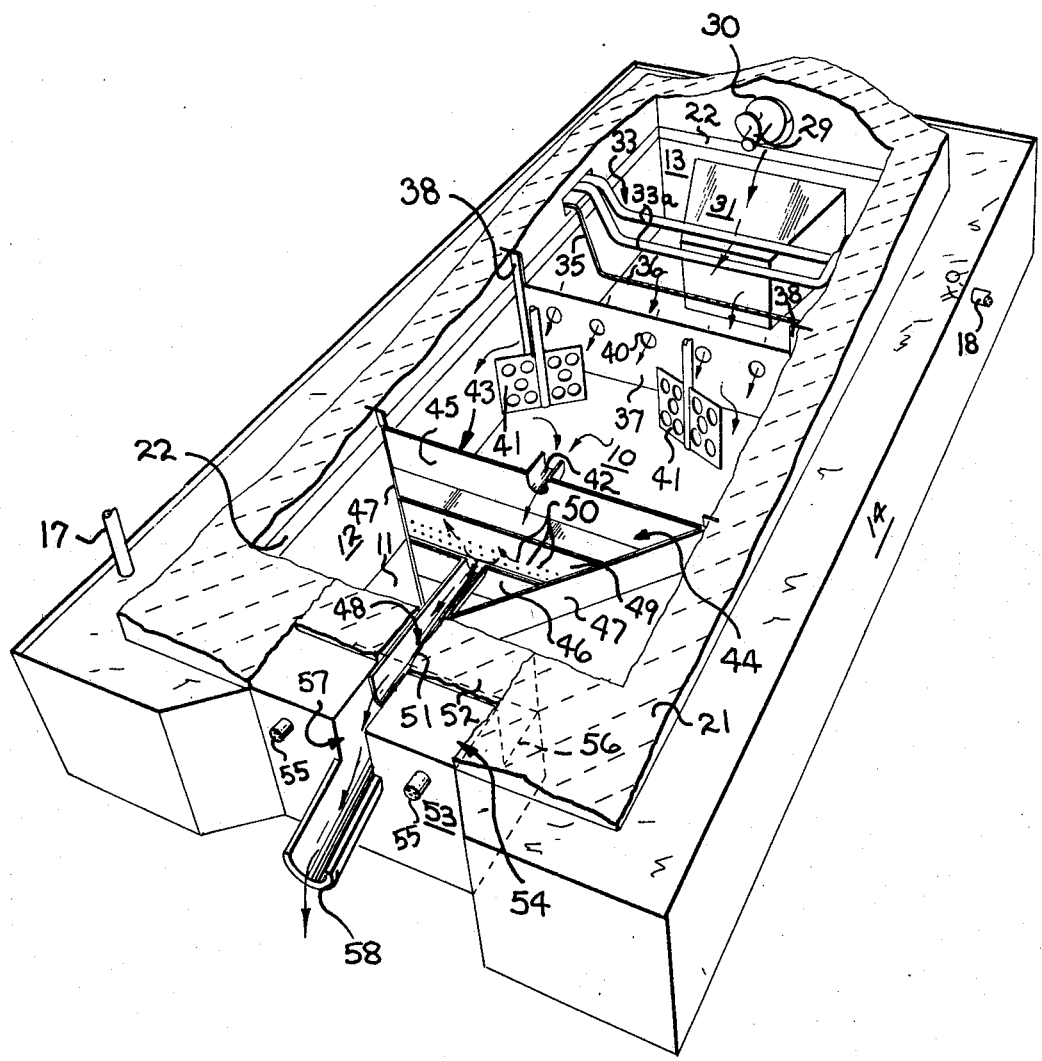
FIG. 1 is a perspective view showing particularly the inner or glass batch-containing tank and various elements positioned therein.
Figure 2:
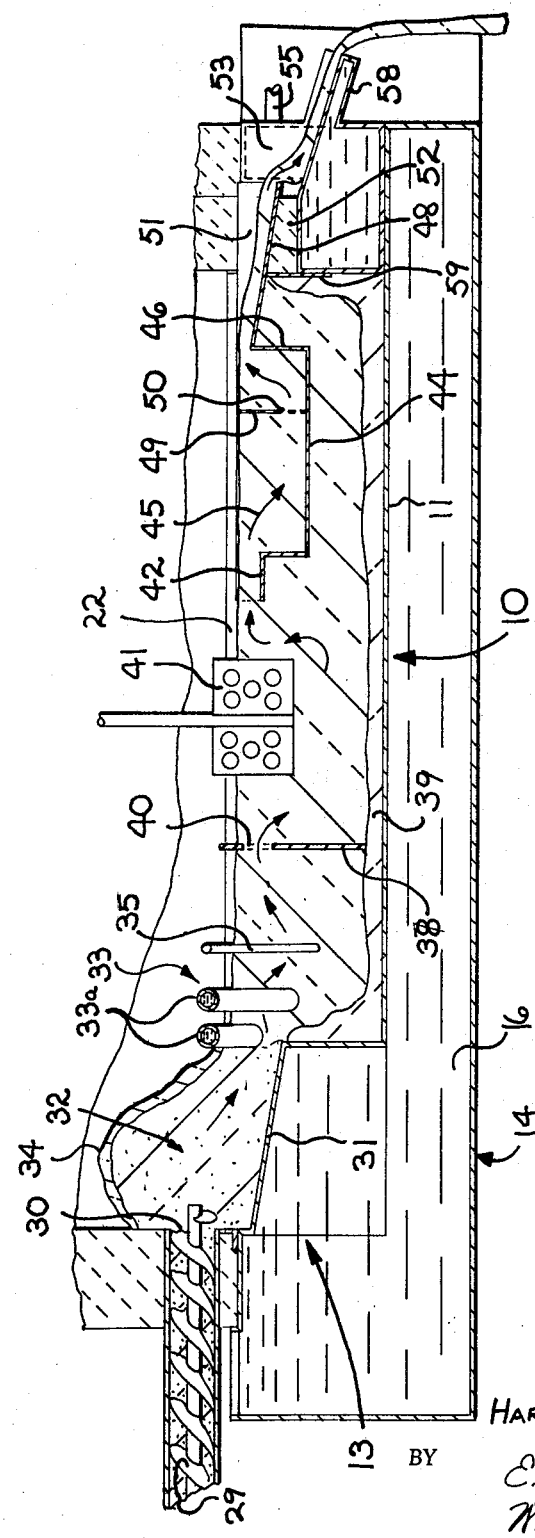
FIG. 2 is a vertical central longitudinal sectional view of the furnace.
Figure 4:
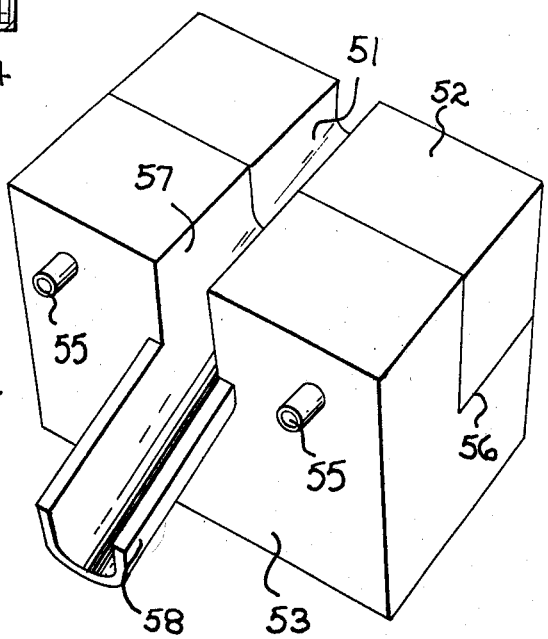
FIG. 4 is a perspective view of the discharge spout or trough unit.

Beyond the shorter end wall 46, the refiner floor has been discontinued (FIG. 1) and across this open section is the discharge spout 48 or trough substantially in longitudinal alignment with the aforementioned inlet trough 42. This discharge sprout 48 extends through a channel 51 in the upper side of a refractory insulating block 52 and terminates in a water-cooled spout unit 53, or block, which fits into a recess 54 provided in an end wall of the furnace. This block 53 may be formed of sheet metal and is hollow and water-cooled. Pipes 55 provide means for circulating cool water through the unit. The previously-mentioned refractory block 52 of insulating material protects the platinum spout 48 against loss of heat and consequent probable cold glass build-up thereon, such as most likely would occur if the coolant impinged upon this section. The water-cooled spout block 53, as indicated above, is a hollow metal box (FIG. 4) formed with a step 56 upon which the refractory insulating block 52 rests. A channel 57 in the block 52 registers with both the platinum trough 48 and a final discharge spout 58 which is water-cooled so that hot glass falling onto it from the platinum trough is quenched. This relatively cool glass then falls by gravity into a fritting mechanism (not shown). To protect the insulating block 52 and otherwise exposed surfaces of the unit 53 against the possible corrosive effects of the glass, a platinum shield strip 59 is positioned about as shown in FIG. 2. Thus, furnace life is prolonged quite materially.

What is claimed is:

1. A glass melting furnace comprising, generally rectangular inner and outer, metal, open-top tanks positioned one within the other and spaced apart to define a cooling chamber about and beneath the inner tank, means for circulating a liquid cooling agent through the chamber, refractory walls and a roof providing a heating chamber over the inner tank, means for heating the latter chamber to melt the glass batch, there being an inlet for batch in one wall and a discharge means in the opposite wall, an inclined shelf upon which the batch is deposited upon initial entry into the tank, means for cooling said shelf, a transverse bridge adjacent the shelf to retard flow of batch from the shelf thereby to create a pile of batch on the latter and retard flow of batch from the shelf, means for cooling the bridge, and means intermediate the inlet and trough for agitating the batch during melting.

2. A furnace substantially as defined in claim 1, and refining means in close proximity to the discharge trough comprising, a screen-like member through which all glass entering the discharge trough must first pass and batch stirring means ahead of said member.

3. A furnace substantially as defined in claim 1, the bridge comprising a pair of generally horizontal parallel, transverse, pipes spaced a short distance from the lower forward end of said shelf and from each other, and means for water-cooling said pipes.

4. A furnace substantially as defined in claim 2,
the refining means also including a chamber generally triangular in top plan having a horizontal bottom submerged in the molten glass batch,
side walls extending from the bottom to points above the glass batch surface,
inlet and discharge troughs at opposed ends of the chamber aligned with each other and with the longitudinal axis of the tank, and
said screen-like member being positioned between the two troughs.

5. In a glass melting furnace, generally rectangular inner and outer metal, open-top tanks positioned one within the other and spaced apart defining a cooling chamber about and beneath the inner tank,
means for circulating a liquid cooling agent through the chamber,
refractory walls rising from and at least in part supported by walls of the inner tank, and
a platinum strip covering at least that part of the inner face of the refractory near the inner tank thereby to protect said refractory against the erosive effect of molten glass in the area of the melt-line.

References Cited

UNITED STATES PATENTS

| | | | |
|---|---|---|---|
| 296,227 | 4/1884 | Schulze-Berge | 65—135 |
| 2,707,353 | 5/1955 | Honiss | 65—346 |
| 2,918,754 | 12/1959 | Plumer | 65—347 X |
| 3,244,493 | 4/1966 | Cala | 65—135 |
| 3,244,496 | 4/1966 | Apple et al. | 65—347 |

ARTHUR D. KELLOGG, Primary Examiner

R. L. LINDSAY, Jr., Assistant Examiner

U.S. Cl. X.R.

65—135, 178, 335, 347, 356